United States Patent
Kleinrichert

(10) Patent No.: US 9,623,383 B1
(45) Date of Patent: *Apr. 18, 2017

(54) SYSTEM TO PREPARE NITROGEN INFUSED BEVERAGES

(71) Applicant: AC DISTRIBUTING, INC., Annapolis, MD (US)

(72) Inventor: Charles Kleinrichert, Annapolis, MD (US)

(73) Assignee: AC DISTRIBUTING, INC., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/190,801

(22) Filed: Jun. 23, 2016

Related U.S. Application Data

(60) Provisional application No. 62/299,608, filed on Feb. 25, 2016.

(51) Int. Cl.

| | | |
|---|---|---|
| *B01F 3/04* | (2006.01) | |
| *B65D 77/06* | (2006.01) | |
| *A23F 5/24* | (2006.01) | |
| *A23L 2/385* | (2006.01) | |
| *A23L 2/54* | (2006.01) | |
| *B01F 15/06* | (2006.01) | |

(52) U.S. Cl.
CPC .......... *B01F 3/04808* (2013.01); *A23F 5/24* (2013.01); *A23L 2/385* (2013.01); *A23L 2/54* (2013.01); *B01F 15/06* (2013.01); *B65D 77/065* (2013.01); *A23V 2002/00* (2013.01); *B01F 2003/049* (2013.01); *B01F 2003/04921* (2013.01); *B01F 2015/061* (2013.01)

(58) Field of Classification Search
CPC ........ B01F 3/04808; B01F 15/06; A23F 5/24; A23L 2/385; A23L 2/54; B65D 77/065
See application file for complete search history.

(56) References Cited

U.S. PATENT DOCUMENTS

| | | | | |
|---|---|---|---|---|
| 3,113,871 | A * | 12/1963 | Webster ................ | A23L 2/76 426/388 |
| 3,582,351 | A * | 6/1971 | Austin et al. .......... | A23F 5/262 426/432 |
| 4,259,360 | A * | 3/1981 | Venetucci ............ | A23L 2/76 426/231 |
| 9,386,782 | B2 * | 7/2016 | Choi ..................... | A23F 5/267 |
| 2008/0148959 | A1 * | 6/2008 | Bockbrader ........ | A47J 31/402 99/323.3 |

(Continued)

*Primary Examiner* — Anthony Weier
(74) *Attorney, Agent, or Firm* — Oblon, McClelland, Maier & Neustadt, L.L.P.

(57) ABSTRACT

A system and method to prepare and dispense a $N_2$ or $N_2/CO_2$ gas infused chilled beverage is provided. The gas infused beverage is obtained by mixing a beverage concentrate with $N_2$ or $N_2/CO_2$ gas infused water under positive pressure and dispensing the prepared beverage through a slow pour faucet. The beverage may be any non-carbonated liquid and in one embodiment the beverage is coffee. The dispensed $N_2$ or $N_2/CO_2$ gas infused chilled coffee has a unique appearance and enhanced flavor and aroma. The system may be provided as a self-contained unit.

15 Claims, 10 Drawing Sheets

(56) References Cited

U.S. PATENT DOCUMENTS

2011/0000229 A1\* 1/2011 Boekhoorn ........... A47J 31/402
  62/56
2016/0136590 A1\* 5/2016 Campbell ........... B01F 3/04439
  366/182.1
2016/0289617 A1\* 10/2016 MacKenzie .............. C12H 1/14

\* cited by examiner

SECTION B-B

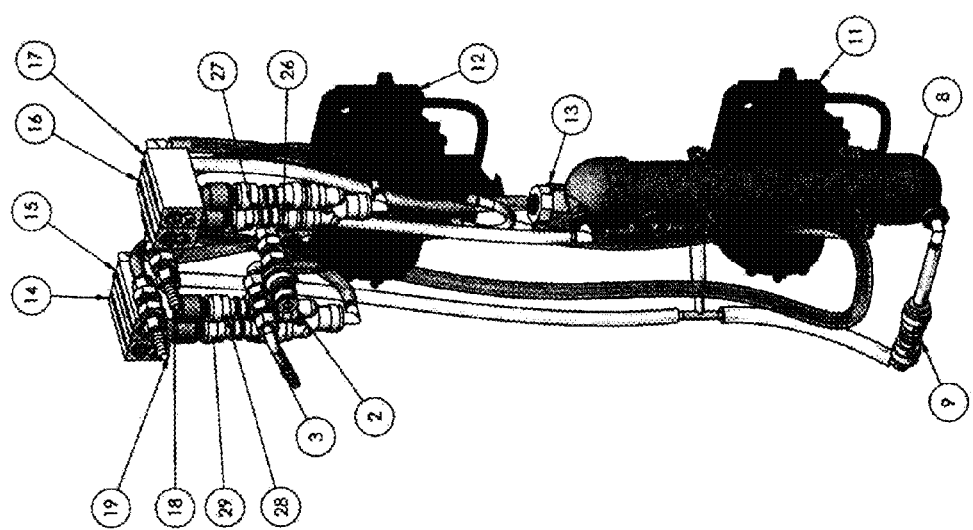

SYSTEM TO PREPARE NITROGEN INFUSED BEVERAGES

CROSS REFERENCE TO RELATED APPLICATIONS

This application claims priority to prior U.S. Application No. 62/299,608 filed Feb. 25, 2016, the disclosure of which is incorporated herein by reference in its entirety.

BACKGROUND OF THE INVENTION

The present invention relates to a system to prepare and dispense a nitrogen infused beverage into a receiver such as a glass or mug so that the dispensed beverage has a flavor, odor and appearance enhanced by the gas infusion and beverage dispensation process.

The use of $N_2$ gas to store and dispense carbonated beverages such as beer and soda is conventionally known and is described, for example in U.S. Pat. No. 6,138,995 and in U.S. Pat. No. 8,438,969. However, infusion of other non-carbonated beverages such as coffee or tea and provision of that product as a chilled beverage to a consumer from a dispensing unit is an area of much interest.

A chilled beverage such as tea or coffee is provided with unique flavor and appearance by $N_2$ infusion and there is a need for a system, preferably a self-contained unit that prepares and dispenses chilled $N_2$ or $N_2/CO_2$ infused beverages both in a commercial utility and in a residential kitchen. In addition to flavor and appearance enhancement of the chilled beverage, the system must also be cost effective and user friendly for utilization and maintenance.

Systems to prepare and dispense such nitrogen infused liquids have been described by the present inventors in PCT/US15/28876, filed May 1, 2015, the disclosure of which is incorporated herein by reference in its entirety and in U.S. Provisional Application No. 61/993,700, filed May 15, 2014, the disclosure of which is incorporated herein by reference in its entirety.

However, in the systems described in these applications the beverage to be infused with a gas, preferably nitrogen or a mixture of nitrogen and carbon dioxide is conducted through a membrane infuser wherein the nitrogen or nitrogen mixture enters the beverage across a membrane surface. Such a system by necessity can be applied only to beverages which are solutions. Membrane performance requires a high gas permeation per unit area to be effective. However, experience has shown that even with a beverage solution such as coffee, the roast and preparation histories of different coffees lead to large variation in the physical properties of the coffee when treated in the infuser. In extreme cases the coffee may gel and severely affect the ability of the membrane to function in the infusion process.

In such cases it is necessary to perform maintenance on the system to rejuvenate or replace the infuser unit. Such operation may be costly in terms of equipment and maintenance, may result in loss of sales in a retail application and may create a hygiene problem within the dispense system overall.

Therefore, there remains a need for a method and a system to prepare and dispense nitrogen infused beverages which is universal in application to different beverages from apple juice to tea and coffee, including beverages such as orange juice which may contain homogenized or dispersed solids and could not be efficiently infused with nitrogen in the systems previously described.

Thus an object on the present invention is to provide an efficient, cost effective system of enhanced hygiene to infuse a broad spectrum of beverages with nitrogen or a nitrogen-carbon dioxide mixed gas and dispense the infused beverage in an attractive and facile method such that the system may be employed in a retail environment or in the home.

A further object is to provide a unit system capable of preparing and dispensing multiple nitrogen infused beverages.

Another object of the present invention is to provide the system as a kit which may be portable or may be permanently installed.

SUMMARY OF THE INVENTION

These and other objects are achieved by the present invention, the first embodiment of which includes a system for preparing and dispensing a nitrogen infused beverage, comprising:

a bag-in-box beverage concentrate container;

a first diaphragm pump controlling flow of a beverage concentrate through a beverage line from the bag-in-box container to a first flow controlling needle valve and from the first needle valve to a liquid mixing point, wherein a first back-check valve is optionally present prior to the first flow controlling needle valve or after the flow controlling needle valve and prior to the liquid mixing point;

a second diaphragm pump controlling water flow through a water line from a water supply to a liquid/gas contactor membrane unit and from the contactor unit to a second flow controlling needle valve and from the second needle valve to the liquid mixing point wherein a second back-check valve is optionally present prior to the second flow controlling needle valve or after the flow controlling needle valve and prior to the liquid mixing point;

a controlled pressurized supply of a gas comprising at least 50% by weight nitrogen attached to the liquid/gas contactor membrane unit;

the liquid/gas contactor membrane unit;

a nitrogen infused beverage line from the liquid mixing point to a beverage faucet;

wherein the beverage faucet is a slow release faucet such that the infused beverage in the nitrogen infused beverage line remains under pressure during dispense of the beverage from the faucet, and the nitrogen gas feed supply line to the liquid/gas contactor membrane unit comprises a check valve preventing liquid flow from the liquid/gas contactor membrane unit into the pressurized gas supply line.

In a further aspect of the invention a beverage dispense kit, comprising at least the system described in the first embodiment in a self-contained unit is provided. The self-contained dispense kit may be capable of being affixed to a wall or a panel or may be a stand-alone floor or countertop unit.

Additionally, beverage dispense kit may further contain an integrated system for dispense of a non-nitrogen infused beverage; the non-nitrogen infused beverage system comprising: a water line directly from the second diaphragm pump to a third flow controlling needle valve, and to a non-nitrogenated beverage mixing point;

a second beverage concentrate line from the first diaphragm pump to a fourth flow controlling needle valve, and to the non-nitrogenated beverage mixing point;

a beverage line from the non-nitrogenated beverage mixing point to a non-nitrogenated beverage faucet; and a non-nitrogenated beverage dispense tower comprising the non-nitrogenated beverage faucet.

Any of the systems or kits described herein may include a chiller or refrigeration unit that cools at least the bag in box beverage concentrate container and may additionally cool the water, the liquid/gas contactor membrane unit and at least a portion of the dispense tower.

In a further special aspect, the beverage faucet for the nitrogen infused beverage is a slow pour faucet optionally fitted with a restrictor nozzle or restrictor plate that allows for release of $N_2$ or $N_2/CO_2$ gas from the beverage when dispensed to a receiver.

In another embodiment, the present invention includes a method for preparing and dispensing a nitrogen infused liquid from the systems described in the above embodiments and further aspects thereof. The method comprises: transferring a beverage concentrate from the bag-in-box container through the first flow controlling needle valve to the liquid mixing point under pressure from the first diaphragm pump, simultaneously conveying water from the water supply through the liquid side of the liquid/gas contactor membrane unit under pressure from the second diaphragm pump and supplying the nitrogen gas at a pressure of from 20 to 70 psi to a gas side of the liquid/gas contactor membrane unit;

infusing the nitrogen gas into the water across the membrane of the liquid/gas contactor;

further conveying the nitrogen infused water from the liquid/gas contactor through the second flow controlling needle valve to the liquid mixing point;

mixing the beverage concentrate and nitrogen infused water at the liquid mixing point to obtain the nitrogen infused beverage;

supplying the nitrogen infused beverage under pressure to the slow pour beverage faucet; and dispensing the nitrogen infused beverage through the beverage faucet at a controlled rate to a receiver;

wherein the volume and pressure of the beverage concentrate and nitrogen infused water combined at the liquid mixing point are controlled by the first and second flow controlling needle valves respectively, and during the dispense of the nitrogen infused beverage, pressure is retained on the nitrogen infused beverage in the beverage line from the mixing point to the faucet.

In a special embodiment of the invention the dispensed beverage is nitrogen infused chilled coffee.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a drawing showing the basic components and one arrangement of the water and beverage concentrate systems according to an embodiment of the present invention where back check valves are included prior to the needle flow control valves.

DETAILED DESCRIPTION OF THE PREFERRED EMBODIMENTS

Figure 1:
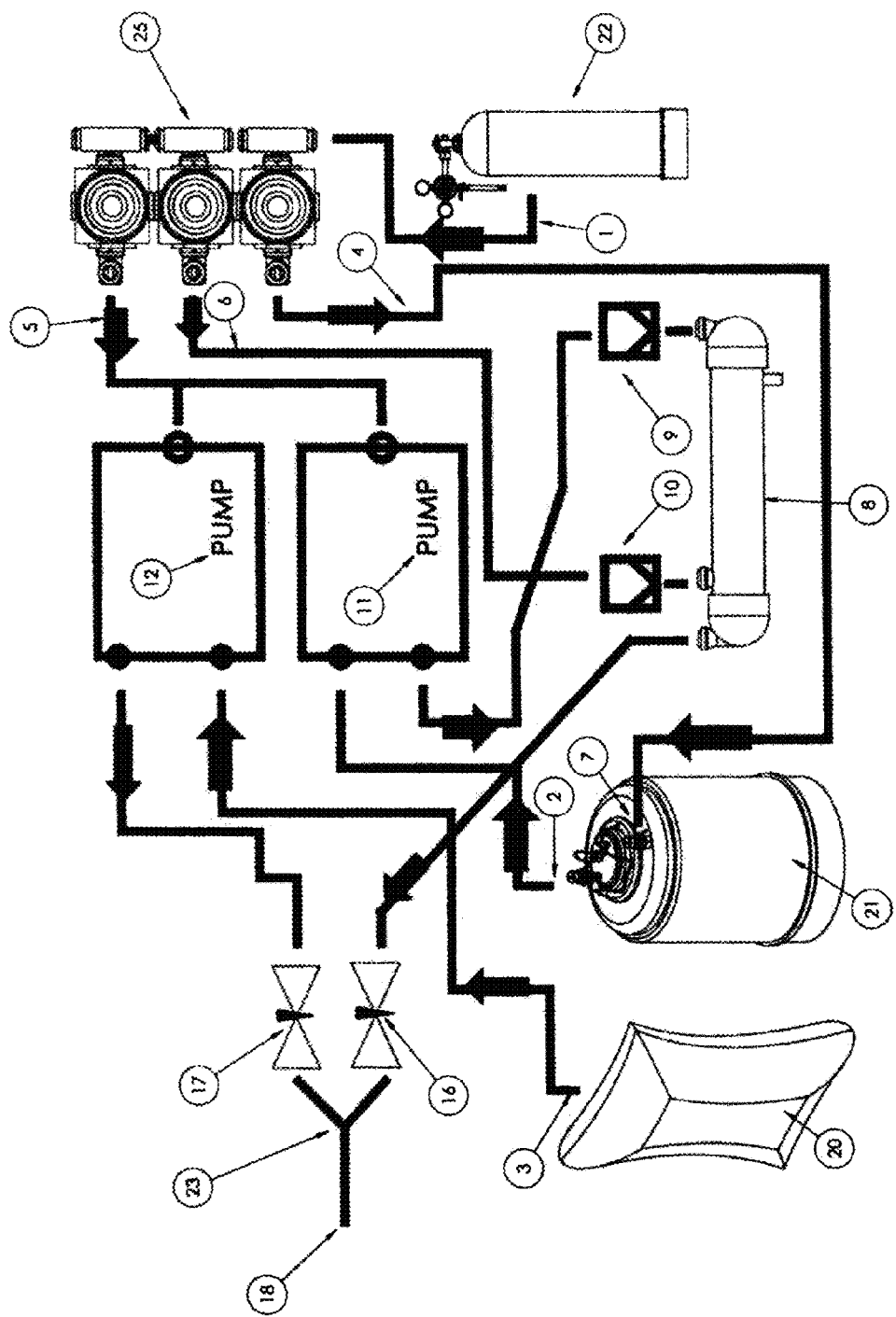
FIG. 1 is a schematic diagram of the bag-in-box beverage concentrate based dispense system according to one embodiment of the invention.

Throughout this description all ranges described include all values and sub-ranges therein, unless otherwise specified. Additionally, the indefinite article "a" or "an" carries the meaning of "one or more" throughout the description, unless otherwise specified.

According to the present invention the term "beverage" means any noncarbonated aqueous liquid material that is a homogeneous liquid having a flavor due to dissolved components. According to embodiments of the invention the liquid supplied as a concentrate from a bag-in-box container may contain suspended solids. As used herein the term concentrate describes any beverage in a high ingredient content form which is diluted with water to a level appropriate for consumption and enjoyment.

According to the present invention dispensing of the chilled beverage means opening a faucet of the system to allow the chilled $N_2$ or $N_2/CO_2$ infused beverage to flow from the system into a receiver such as a glass, mug or other drinking container. Throughout the following description the term "gas infused" will be employed to describe either $N_2$ or $N_2/CO_2$ infused beverage. If an embodiment is directed specifically to a $N_2/CO_2$ mixture or specifically to only $N_2$ infusion, the actual gas composition is explicitly disclosed.

Dispensing of the gas infused chilled beverage is an element of the present invention wherein reduction of pressure on the gas infused beverage allows escape of infused gas and results in unique properties which distinguishes the dispensed beverage by enhancement of the beverage's flavor and/or appearance.

Throughout this description, the terms nitrogen, nitrogen gas, $N_2$ and $N_2$ gas are used interchangeably and convey the same meaning unless otherwise specified. The term mixed gas is used to describe a gas mixture containing at least 50% $N_2$ with the remainder being carbon dioxide. Further, nitrogen infused water may be referred to as "nitro-water" and describes water infused with nitrogen or a mixed gas.

Additionally, the prepared nitrogen infused beverage may be referred to as "nitro-beverage."

The present inventors have recognized that beverages other than carbonated drinks such as beer and soda may have enhanced flavor and attractive appearance as a result of infusing the beverage with nitrogen or a mixture of nitrogen and carbon dioxide. Upon study of methods to disperse and dissolve nitrogen or a combination of nitrogen and carbon dioxide into a chilled beverage such as coffee, tea or other noncarbonated beverages such as juices and electrolyte drinks, for example, the inventors have designed a dispense system having advantages over the systems described in U.S. Provisional Application No. 61/993,700 and PCT/US15/28876 to provide a gas infused chilled beverage in such a way to present the beverage with a unique and appealing flavor and appearance. At the same time the system offers the opportunity to prepare and dispense a wide range of nitrogen infused beverages with low maintenance requirements and with good system hygiene.

Thus, in a first embodiment as shown schematically in FIG. 1, the present invention provides a system for preparing and dispensing a nitrogen infused beverage, comprising: a bag-in-box beverage container (20); a first diaphragm pump (12) controlling flow through a beverage line (3) from the bag-in-box container to a first flow controlling needle valve (17) and from the first needle valve to a liquid mixing point (23), a second diaphragm pump (11) controlling water flow through a water line (2) from a water supply to a liquid/gas contactor membrane unit (8) and from the contactor unit to a second flow controlling needle valve (16) and from the second needle valve to the liquid mixing point (23); a controlled pressurized supply of a gas comprising at least 50% by weight nitrogen attached to the liquid/gas contactor membrane unit (22); the liquid/gas contactor membrane unit (8); a nitrogen infused beverage line (18) from the liquid mixing point to a beverage faucet (FIG. 4); wherein the beverage faucet is a slow release faucet such that the infused beverage in the nitrogen infused beverage line remains under pressure during dispense of the beverage from the faucet, and the nitrogen gas feed supply line to the liquid/gas contactor membrane unit comprises a check valve (10) preventing liquid flow from the liquid/gas contactor membrane unit into the pressurized gas supply line.

Figure 2:
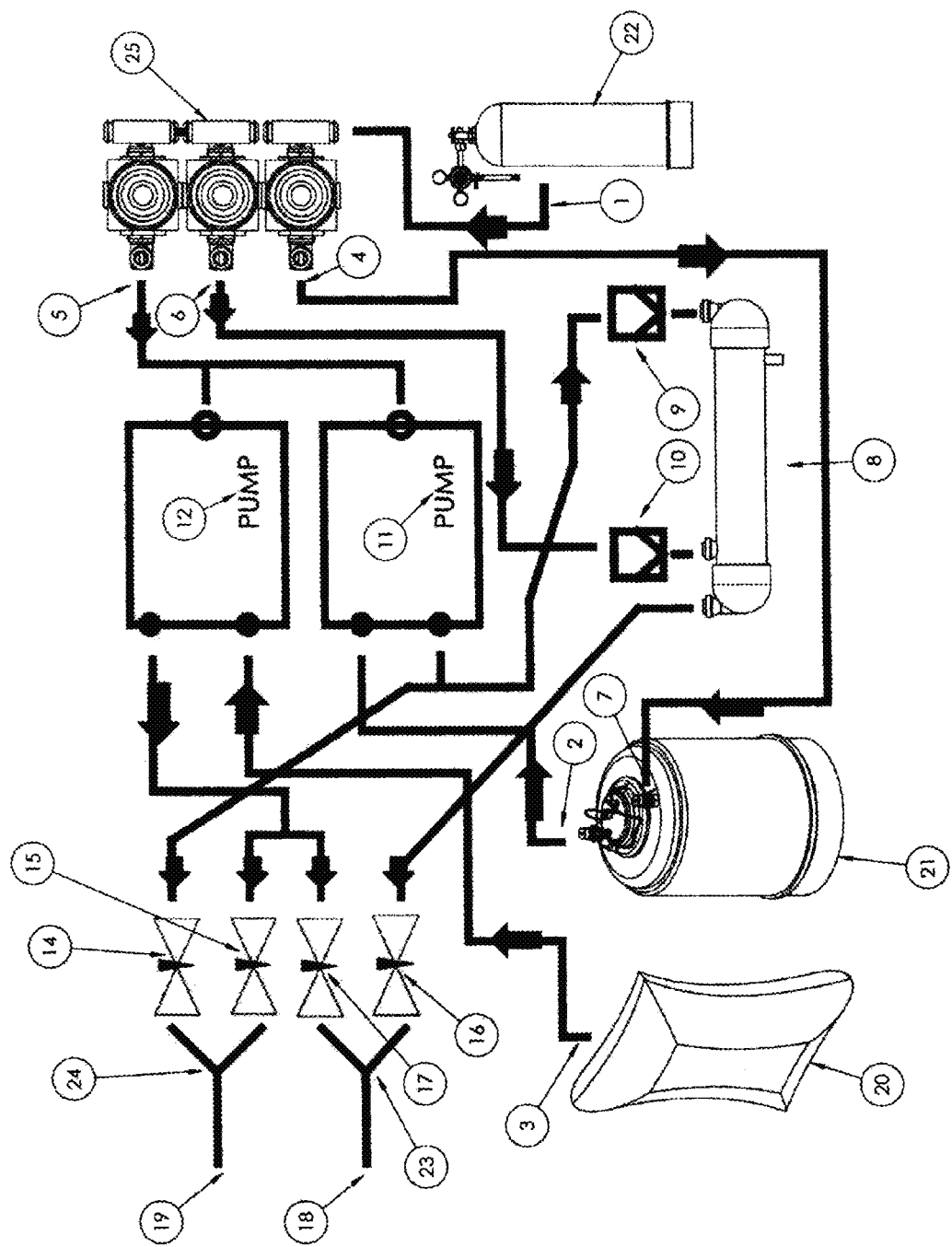
FIG. 2 is a schematic diagram of the bag-in-box beverage concentrate based dispense system which also contains an integrated dispense system for the same beverage in a non-nitrogenated form.

As indicated by the above description and in FIGS. 1 and 2, the mixing of the beverage concentrate and the nitrogen infused water takes place in line at the liquid mixing point and nitrogenated beverage line leading to the faucet under pressure rather than at the dispense nozzle as would normally take place on a soda dispenser or bar gun. The carbonated water and concentrate on a soda dispense system for example would both independently be fed to a nozzle and be mixed upon pouring the beverage. According to the design of the present invention nitrogenated water is blended with the concentrate under pressure which causes a forced in line nitrogenation of the concentrate as it is mixed with the nitro-water. This takes place as a result of the back pressure "restriction" in line from the slow pour faucet which has a restrictor disc causing the necessary line pressure to achieve the infusion.

Forced nitrogenation of products such as coffee has been accomplished by many people by applying high N2 pressure to cold brew coffee inside of a tank. This process will infuse N2 into solution over time and the effects are enhanced by shaking the tank on occasion and lowering the temp. In contrast, the present method of nitrogenating water and then blending with a coffee concentrate or other beverage concentrate forces nitrogenating the product in the line from the mixing point using back pressure and the length of the nitrogenated beverage dispense line.

Figure 8:
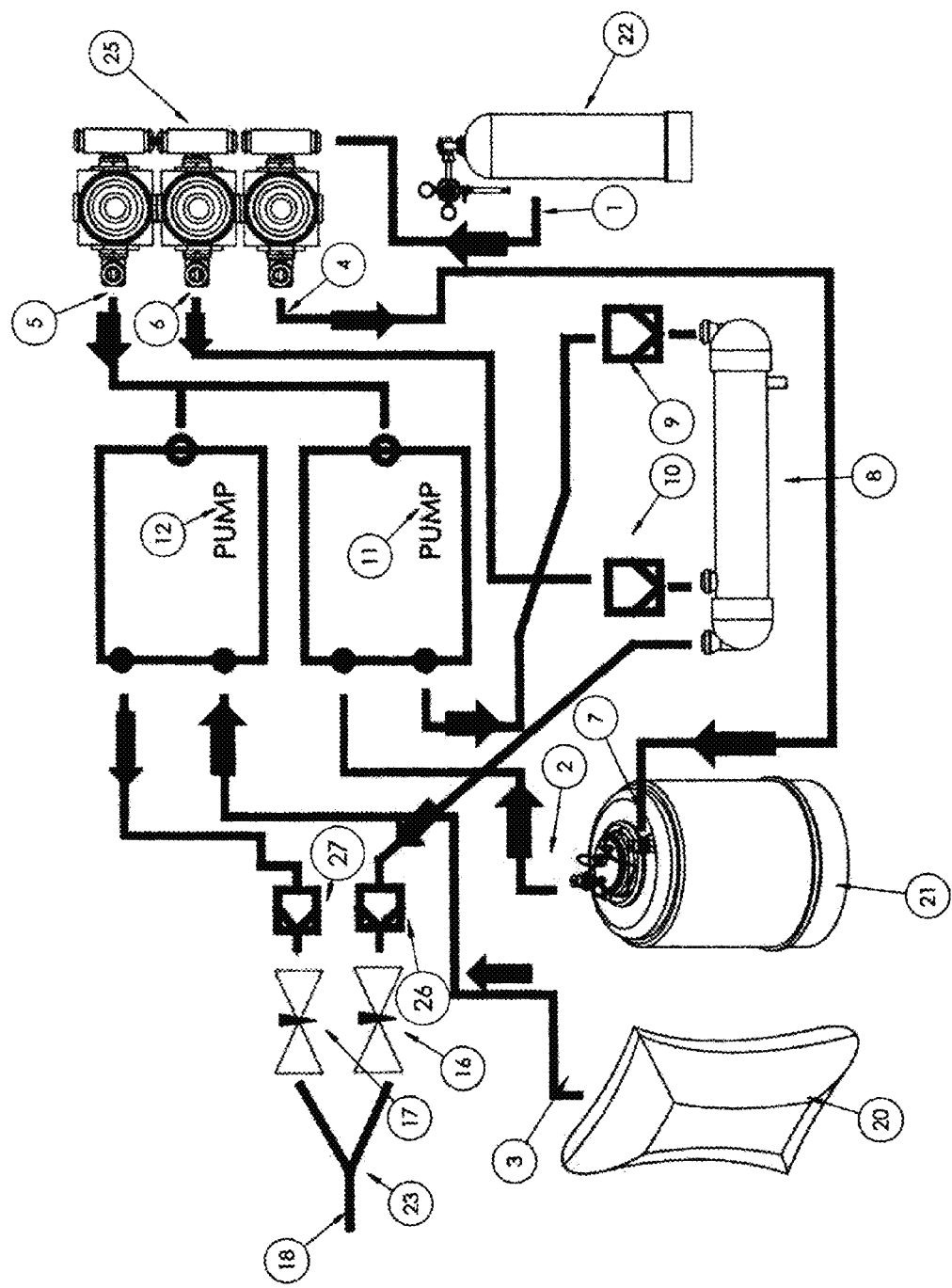
FIG. 8 is a schematic diagram of the bag-in-box beverage concentrate based dispense system according to an embodiment of the invention where back check valves are included in the beverage concentrate and nitro water lines.

In the embodiment as shown in FIG. 1, back check valves may optionally be placed prior to needle flow controlling valves (16) and (17) or just after valves (16) and (17) but before the liquid mixing point (23). Use of such back check valves may serve to support the necessary pressure for mixing of the nitro-water and beverage concentrate and protect both systems from back-flush. An example of a system containing back check valves (26) and (27) prior to the valves (16) and (17) is shown in FIG. 8.

Further, in the embodiment shown in FIG. 1, the water supply may be provided from a pressurizable container (21) pressurized with nitrogen or nitrogen mixed gas through gas line (4) from nitrogen supply (22). In this embodiment, the nitrogen is supplied through a manifold of independent gas regulators (25) to each of the diaphragm pumps (5), to the liquid/gas contactor membrane unit (6) and to the pressurizable water supply container (4). Use of a water supply container such as shown in (21) offers an advantage that both the bag-in-box beverage concentrate and the water container may be cooled by a refrigeration or chiller unit. Alternatively, all or selected individual components of the embodiments shown in FIGS. 1 and 2 may be cooled by one or more refrigeration or chiller units, preferably one common cooling unit.

The system may optionally incorporate an inline strainer and/or filtration unit (not shown in FIG. 1) in the water line from the water supply to the liquid/gas contactor membrane unit in order to protect the gas permeable membranes of the liquid/gas contactor membrane unit from solids which may be present in the water.

Bag-in-box containers are commercially available in a range of volume sizes and materials of construction. Any suitable container of volume size convenient to the intended application may be employed. Generally, a container of 1 to 5 gallons is employed based on convenience of handling and size and structure of the refrigeration system to be employed. However, systems constructed for high volume dispense may be larger, for example 10 gallons or more. The box component of the container may be corrugated cardboard while the bag may be constructed of any material accepted for use in the food and beverage industry.

In a commercial system as diagrammed in FIG. 2, the system may further contain a dispense line for a non-nitrogenated beverage (still beverage) wherein still water from diaphragm pump (11) is pumped directly to a flow controlling ejector (14), to the liquid mixing point (24) where the water is mixed with beverage concentrate and supplied to a non-nitrogenated (still) beverage faucet (not shown). The description above regarding cooling of the components in FIG. 1 also applies to FIG. 2. As described with the embodiment shown in FIG. 1 and demonstrated in FIG. 8, back check valves may optionally be placed prior to needle flow controlling valves (14), (15), (16) and (17) or just after valves (14), (15), (16) and (17) but before the liquid mixing point (23).

Figure 9:
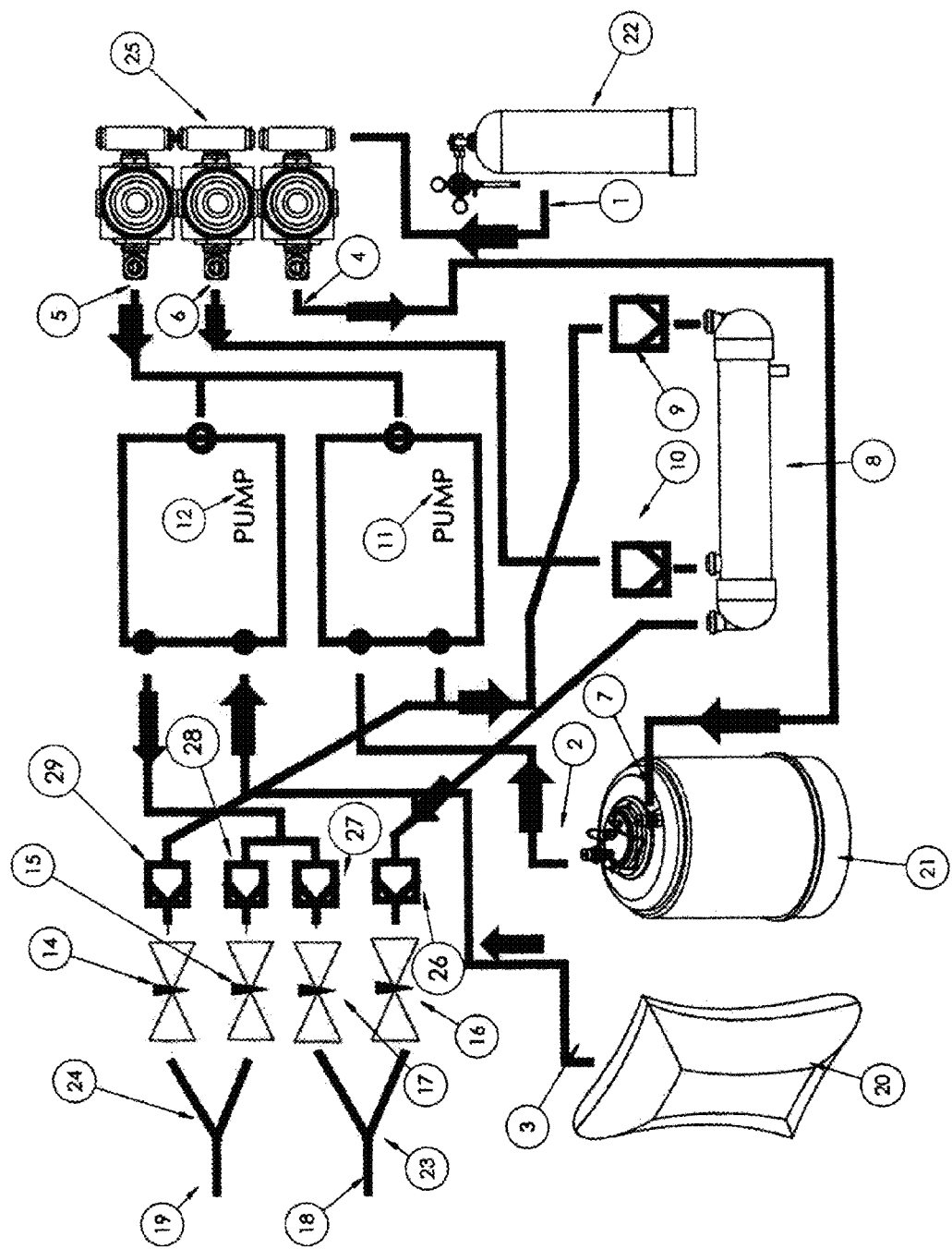
FIG. 9 is a schematic diagram of the bag-in-box beverage concentrate based dispense system which also contains an integrated dispense system for the same beverage in a non-nitrogenated form where back check valves are included prior to the needle flow control valves.

An example of a system containing back check valves (26), (27), (28) and (29) prior to the valves (14), (15), (16) and (17) is shown in FIG. 9. FIG. 10 shows one possible arrangement of the beverage and water system shown schematically in FIG. 9.

FIGS. 1 and 2 schematically show the arrangement of the fundamental components of the dispense systems of the present invention. However, in the construction of commercial functional units secondary components such as safety regulators, valves, couplings, harnesses, support structure and other functional components known to one of skill in the beverage dispense technology may be incorporated in the system. Such commercial arrangements are included in the present invention as long as the structural components and arrangements disclosed herein are present.

Figure 4:
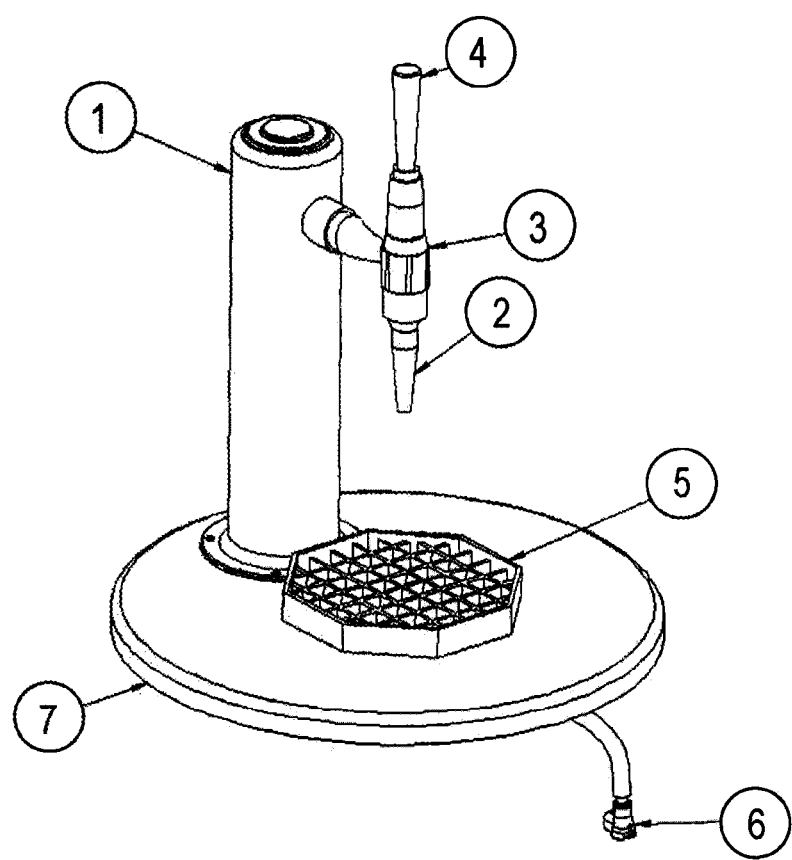
FIG. 4 shows a diagram of a tower assembly according to an embodiment of the present invention.

The faucet (3) shown in FIG. 4 may be a slow pour faucet designed to dispense the chilled gas infused beverage at a controlled rate to allow foam formation upon dispense and provide the unique flavor and appearance associated with the product obtained via dispense from the system of this invention. Such slow pour faucets retain pressure necessary for mixing of the nitro-water and beverage concentrate in the nitrogenated beverage line after the liquid mixing point even when nitrogenated beverage is being dispensed. Commercially available faucets typically employed to tap beer are suitable for use as the faucet (3).

FIG. 4 shows a schematic diagram of a faucet tower assembly (1) according to an embodiment of the invention. In a highly preferred aspect of the invention a restrictor nozzle (2) is inserted in the tip of the faucet to further enhance the foam formation during liquid dispense. Restrictor nozzles providing differing dispense characteristics are known and commercially available. Additionally, a restrictor plate may be employed in place of or in combination with the nozzle to enhance the frothing effect of the dispense system. The embodiment shown in FIG. 4 also includes a tap handle (4) which may be a decorative enhancement to the system, a drip tray (5) and quick connect coupling (6) to line (18) shown in FIGS. 1 and 2. The tap handle, drip tray and quick connect coupling are commercial enhancements to the system and are not elements of the present invention.

Figure 7:
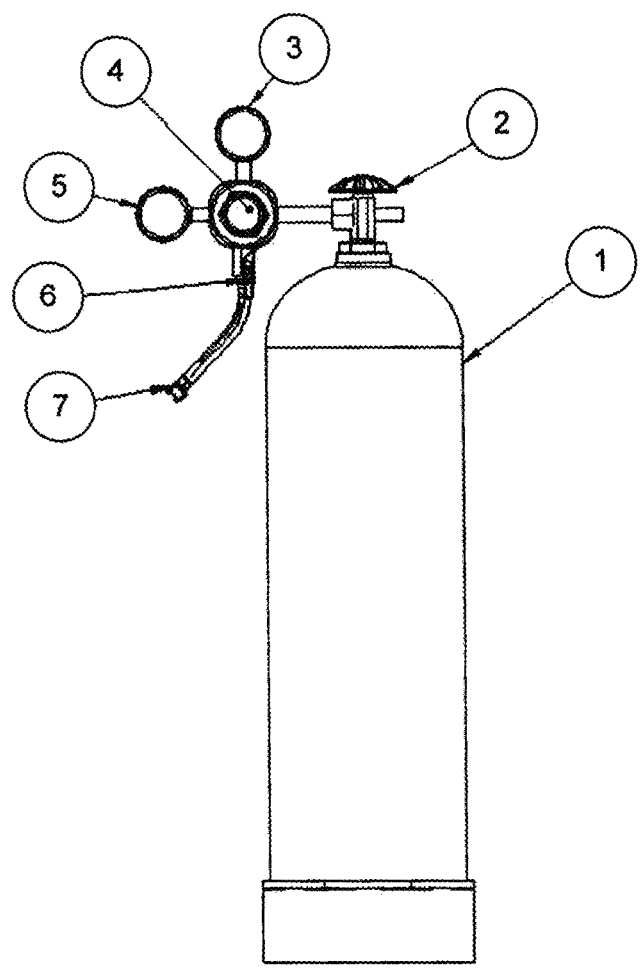
FIG. 7 shows a gas supply assembly suitable for use with the system of the present invention.

FIG. 7 shows a standard gas supply assembly that may be utilized with the dispense system of the present invention. The invention is not limited to the assembly of FIG. 7 and any pressure regulated supply system providing nitrogen or nitrogen mixed gas may be employed.

The component identification numbering for the gas supply system shown in FIG. 7 is identified according to the following key.
  (1) $N_2$ or mixed gas tank
  (2) tank open/close valve
  (3) outlet pressure gauge
  (4) regulator adjustment control
  (5) gas volume gauge
  (6) regulator valve
  (7) gas quick connect coupling In preferred embodiments the system is arranged or constituted in a self-contained unit or dispense kit that may be conveniently shipped to and placed in a commercial establishment for preparation and dispensation of specialty gas infused chilled beverages. The system may or may not include a chilling or refrigeration unit capable of cooling the system components and beverage concentrate therein to a temperature less than ambient or room temperature. However, if the cooling capability is not included in the system provision to maintain the beverage concentrate in a cooled state may be made according to methods known to one of ordinary skill in the art.

The self-contained unit provides a user friendly and convenient chilled gas infused beverage preparation and dispensing unit especially suited for coffee bars, cafeterias, restaurants and other commercial establishments where beverages are served. In a special embodiment the present invention provides a kit of the above described components that includes a mounting panel housing which attaches to a wall or panel and mounts some or all of the system components to the wall.

The chilling or refrigeration system is capable to cool the system and/or the beverage concentrate therein to approximately 36° F. although the choice of temperature will be dependent upon the beverage being handled in the system and the flavor and appearance sought. Chilling or refrigeration systems suitable for the system of the present invention are commercially available. One particularly preferred system is an IOWA ROTO CAST "BREEZER" cylinder shaped refrigeration unit that may conveniently contain the components of the system.

The nitrogen supply may be a $N_2/CO_2$ mixture having at least 50% by weight $N_2$ or may be essentially pure nitrogen having a $N_2$ content of at least 99.5% by weight. Grades of nitrogen containing differing content of carbon dioxide within this range may be employed to impart varying flavor and appearance effects to the dispensed beverage.

The nitrogen or mixed gas is supplied via a gas regulator valve through a pressure rated supply line to the liquid/gas contactor membrane unit. The pressure of the water pumped into the liquid/gas contactor membrane unit and the pressure of the $N_2$ or $N_2/CO_2$ gas in the liquid/gas contactor membrane unit may be controlled independently of one another.

The diaphragm pump may be any appropriately sized diaphragm pump constructed for transfer of liquids for human consumption. Pumps suitable for this use are commercially available and as one example, a "SHURFLO BEER ACE" diaphragm pump may be noted.

A check valve is located in the $N_2$ feed line to the liquid/gas contactor membrane unit to prevent liquid "backflow" from the liquid/gas contactor membrane unit to the nitrogen gas supply.

The liquid/gas contactor membrane unit is any suitable membrane unit containing hollow fibers such that $N_2$ or $N_2/CO_2$ mixture gas supplied to the liquid/gas contactor membrane unit contacts the water via passage through a gas permeable membrane and is dissolved and/or dispersed into the water to form a $N_2$ or $N_2/CO_2$ infused water feed.

Figure 3:
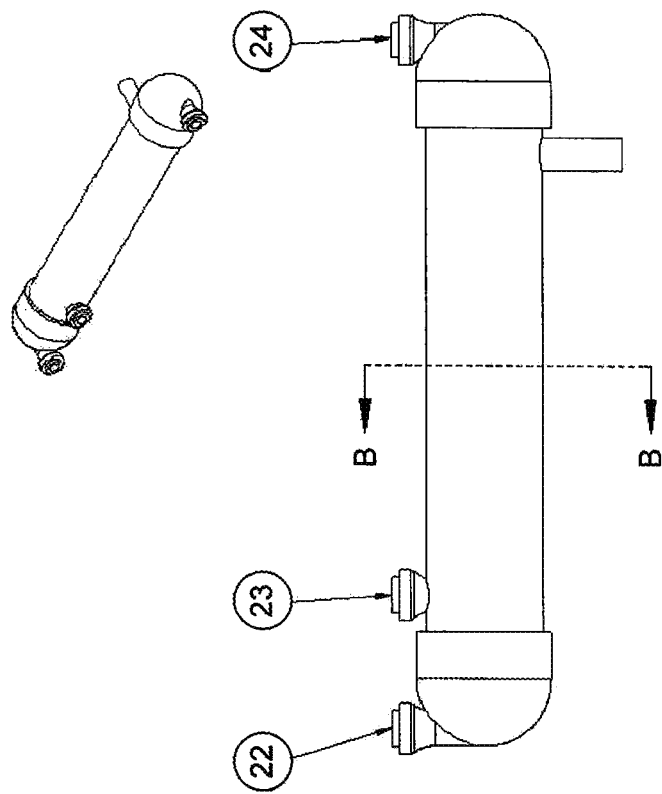
FIG. 3 is a schematic diagram of a liquid/gas contactor membrane unit.
Figure 3:
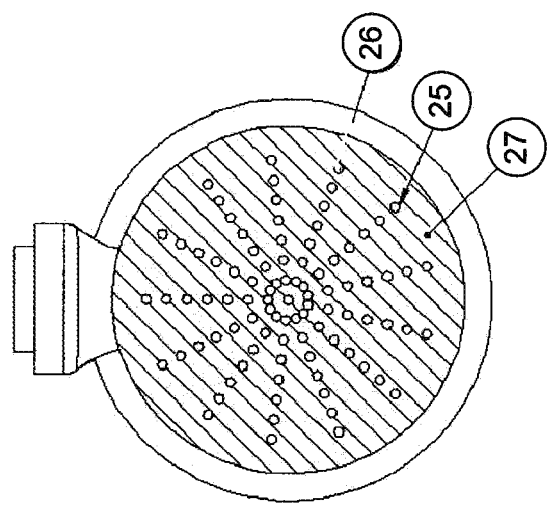

In general description, a liquid/gas contactor membrane unit may be constructed of a cylindrical tube containing hollow fiber membranes. Water is pumped into the space about the exterior of the hollow membranes. $N_2$ or $N_2/CO_2$ gas at a set pressure as determined by the supply regulator is passed into the interior of the hollow fiber membrane from where it permeates through the membrane and the permeate $N_2$ or $N_2/CO_2$ contacts the water on the exterior of the membrane and infuses into the water. A schematic diagram of an example of a liquid/gas contactor membrane unit is shown in FIG. 3. FIG. 3 is an independent drawing and the numeric identification applies only to FIG. 3. As indicated in the cross-sectional view B-B the contactor unit contains a series of hollow fiber membranes (25) arranged within a solid casing (26) and surrounded by fluid space (27). Liquid/gas contactor units are conventionally known and any unit which provides for gas-liquid contact across a permeable membrane may be suitably employed. In one embodiment of FIG. 3, the $N_2$ or $N_2$ mixed gas is passed through the hollow membranes while the water is passed through the fluid space surrounding the hollow fiber membranes. However, it is also possible to pass the water through the hollow fiber membranes while passing the $N_2$ or $N_2$ mixed gas through the fluid space. Variation and control of the gas pressure in the interior of the hollow fiber membrane relative to the pressure of the water on the exterior of the hollow fiber membrane allows for differing degrees of gas infusion into the water.

The gas infused water (Nitro water) is transported from the liquid/gas contactor membrane through the flow controlling needle valve or brix valve such as for example, a Brix Block® unit and then optionally, through a back check valve to the liquid mixing point where the nitrogen infused water is mixed with the beverage concentrate. Flow controlling needle valves and similar devices are commercially available and any system compatible with the arrangement of the embodiments described in the present invention may be employed.

Simultaneously, the beverage concentrate is pumped from the bag-in-box container by the diaphragm pimp directly to a separate beverage concentrate flow controlling needle valve, preferably a Brix Block® unit and then optionally through a back check valve to the liquid mixing point.

The structure of the liquid mixing point may be of any configuration which leads to complete mixing of the nitrogen infused water and the beverage concentrate and may be as simple in design as a "Y" structure where the two lines fuse to one line or may be a more sophisticated passive liquid mixing unit as is well known in the art.

The flow rate and relative proportion of beverage concentrate and nitrogen infused water which enters the mixing point may be controlled by adjustment of the pressure from each of the diaphragm pumps and by adjustment of the flow through each of the flow controlling needle valves.

The nitrogen infused beverage obtained at the liquid mixing point is retained under pressure and moves toward the dispense tower equipped with a beverage faucet. In a preferred embodiment, the beverage faucet is a slow pour faucet that dispenses the chilled gas infused beverage at a rate of from 0.1 to 5 ounces per second, preferably from 0.5 to 3 ounces per second and most preferably from 0.8 to 1.2 ounces per second. This effect and dispense rate may be further enhanced by insertion of a restrictor nozzle in the tip of the faucet as previously described.

Importantly, the nitrogen infused beverage in the beverage line between the mixing point and the dispense faucet is maintained under a positive pressure even during dispense of the nitrogen infused beverage through the faucet. As previously indicated this positive pressure supports the nitrogenation of the beverage as it is diluted with the nitro water.

In another embodiment of the present invention the dispense unit as schematically shown in FIGS. 1 and 2 may be assembled in a unit suitable for mounting on a wall or a panel of a vehicle. The arrangement of the component parts may be vertical or horizontal and may have components on opposite sides of the wall or panel. For example, only the faucet tower may be visible on one side while the other functional components including the refrigeration unit, liquid/gas contactor, beverage container, pump and lines are out of view on the opposite side. The present invention includes all such arrangements as long as the schematic arrangement shown in FIG. 1 and recited in the following Claims is present.

Figure 5:
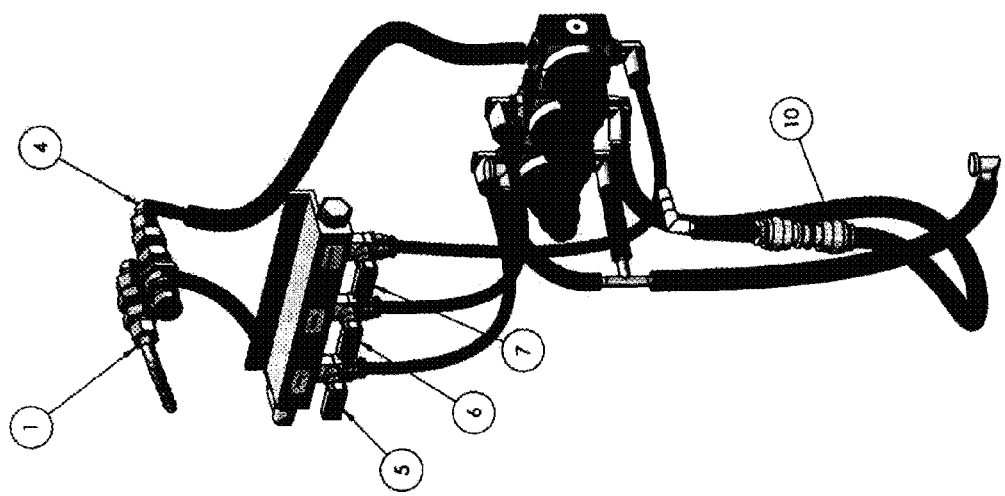
FIG. 5 is a drawing of the basic components and one arrangement of a nitrogen gas supply and control system according to an embodiment of the invention.
Figure 6:
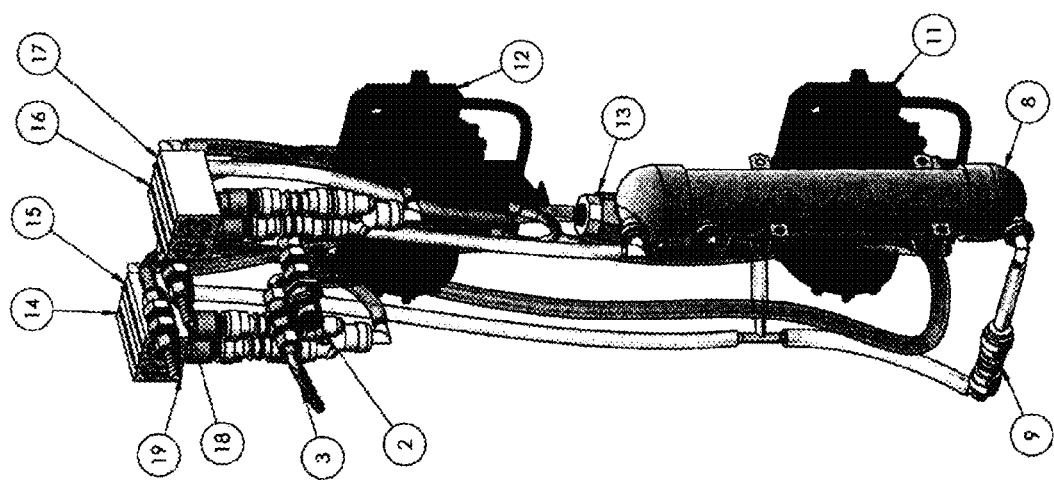
FIG. 6 is a drawing showing the basic components and one arrangement of the water and beverage concentrate systems according to one embodiment of the present invention.

Drawings showing example possible physical arrangements of the components of the gas supply system and the water and beverage concentrate system are shown in FIGS. 5, 6 and 10, respectively. FIGS. 6 and 10 include a still (non-nitrogenated) beverage system.

A key to identify the components of FIGS. 5, 6 and 10 is listed below. In this key components common to the figures have the same identification number.

(1) Gas inlet
(2) Water inlet
(3) Beverage concentrate inlet
(4) $N_2$ supply to water container
(5) $N_2$ regulator valve to diaphragm pumps
(6) $N_2$ regulator valve to liquid gas contactor membrane
(7) $N_2$ regulator valve to water container
(8) Liquid gas contactor unit
(9) Water back check valve
(10) $N_2$ back check valve
(11) Water diaphragm pump
(12) Beverage diaphragm pump
(13) Water regulator valve
(14) Still water brix unit
(15) Beverage brix unit
(16) Nitro water brix
(17) Nitro-beverage brix
(18) Nitro-beverage outlet
(19) Still-beverage outlet
(26) Back check valve nitro water to nitro outlet
(27) Back check valve beverage concentrate to nitro outlet
(28) Back check valve beverage concentrate to still outlet
(29) Back check valve water to still outlet In another embodiment, the present invention provides a method for preparing and dispensing a chilled gas infused beverage from a system of the present invention. The method comprises transferring a beverage concentrate from the bag-in-box container through the first flow controlling needle valve to the liquid mixing point under pressure from the first diaphragm pump, simultaneously conveying water from the water supply through the liquid side of the liquid/gas contactor membrane unit under pressure from the second diaphragm pump and supplying the nitrogen gas at a pressure of from 20 to 70 psi to a gas side of the liquid/gas contactor membrane unit;

infusing the nitrogen gas into the water across the membrane of the liquid/gas contactor;

further conveying the nitrogen infused water from the liquid/gas contactor through the second flow controlling needle valve to the liquid mixing point;

mixing the beverage concentrate and nitrogen infused water at the liquid mixing point and nitrogenated beverage line under positive pressure to obtain the nitrogen infused beverage;

supplying the nitrogen infused beverage under pressure to the beverage faucet; and dispensing the nitrogen infused beverage through the beverage faucet at a controlled rate to a receiver;

wherein the volume and pressure of the beverage concentrate and nitrogen infused water combined at the liquid mixing point are controlled by the first and second flow controlling ejectors respectively, and during the dispense of the nitrogen infused beverage, pressure is retained on the nitrogen infused beverage in the beverage line from the mixing point to the faucet.

In one preferred embodiment the beverage concentrate is coffee that is cooled to a temperature of 30 to 40° F., preferably 32 to 38° F. and most preferably, 34 to 37° F. Further, when the beverage is coffee the $N_2$ pressure in the liquid/gas contactor membrane unit is from 20 to 70 psi and the $N_2$ content in the infused chilled coffee obtained when mixed with the infused water at the liquid mixing point is from 20 to 80 ppm, preferably 30 to 60 ppm and most preferable 40 to 50 ppm.

The effect of the slow dispensing of the slow pour faucet is such that upon release from the system and flow to the receiver such as a serving glass, $N_2$ gas escapes from the chilled coffee or other infused beverage as it cascades to the glass and results in the appearance of a head of foam or froth on the surface of the beverage providing a flavor, aroma and appearance unique to the product obtained according to the present invention.

Diaphragm pumps are conventionally employed in industry for the pumping of beer, soda and other beverages, especially because such pumps are compatible with carbonated as well as non-carbonated liquids. Although utility of a diaphragm pump has been disclosed in these embodiments, it may be possible to employ other pumps suitable for liquids intended for human consumption.

The relative pressure of the $N_2$ or $N_2/CO_2$ gas in the liquid/gas contactor membrane unit and the pressure of the water from the diaphragm pump in the liquid/gas contactor membrane unit may be varied in order to impart more unique appearance and possibly flavor enhancement to the dispensed chilled beverage obtained at the liquid mixing point. The ratio of the $N_2$ or $N_2/CO_2$ gas feed pressure to the liquid pressure of the water in the liquid/gas contactor membrane unit may be from 20/1 to 1/20.

One of ordinary skill may learn the effect of variation of the ratio of the $N_2$ or $N_2/CO_2$ gas feed pressure to the liquid pressure of the water in the liquid/gas contactor membrane unit on properties of the dispensed chilled beverage through experimentation and adjust the settings as learned to obtain a $N_2$ or $N_2/CO_2$ infused chilled beverage having unique flavor, aroma and appearance. This study may also include the control of each of the flow controlling ejectors and relative mixing proportions.

In one embodiment the volume ratio of the beverage concentrate to nitrogen infused water mixed at the liquid mixing point may be from 1/10 to 10/1, preferably 1/5 to 5/1, and most preferable, 2/1 to 1/2. These ratios include all subranges and values within the described ranges.

In a further embodiment, the system may further contain a blast chiller unit, wherein a hot liquid such as brewed coffee concentrate or tea concentrate is first rapidly chilled or superchilled to 40° F. or lower and then charged to the bag-in-box container. Such rapid chill may serve to further enhance the flavor and aroma of the $N_2$ or $N_2/CO_2$ infused chilled beverage when mixed with the nitrogen infused water and dispensed to a drinking glass or other receiver.

In a further aspect of the invention, a multiple nitrogen infused beverage dispense system is provided. According to this embodiment, a central or community nitrogen infused water supply is connected to a plurality of beverage concentrate to dispense tower units at a liquid mixing point for each beverage tower. A manifold arrangement of a plurality of nitrogen infused water feed lines, each line containing a flow controlling ejector and back check valve may be constructed. Each separate nitrogen infused water line may be connected to a liquid mixing point of each different dispense tower. Different beverage concentrates may be supplied from separate bag-in-box containers via diaphragm pumps through flow controlling ejector/back check valve arrangement to each individual mixing point and to each distinct faucet.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A system for preparing and dispensing a nitrogen infused beverage, comprising:
   a bag-in-box beverage concentrate container;
   a first diaphragm pump controlling flow of a beverage concentrate through a beverage line from the bag-in-box container to a first flow controlling needle valve and from the first needle valve to a nitrogenated beverage liquid mixing point, wherein a first back-check valve is optionally present prior to the first flow controlling needle valve or after the flow controlling needle valve and prior to the nitrogenated beverage liquid mixing point;
   a second diaphragm pump controlling water flow through a water line from a water supply to a liquid/gas contactor membrane unit and from the contactor unit to a second flow controlling needle valve and from the second needle valve to the nitrogenated beverage liquid mixing point wherein a second back-check valve is optionally present prior to the second flow controlling needle valve or after the flow controlling needle valve and prior to the liquid mixing point;
   a controlled pressurized supply of a gas comprising at least 50% by weight nitrogen attached to the liquid/gas contactor membrane unit;
   the liquid/gas contactor membrane unit;
   a nitrogen infused beverage line from the nitrogenated beverage liquid mixing point to a beverage faucet of a faucet tower;
   wherein
   the beverage faucet is a slow release faucet such that the infused beverage in the nitrogen infused beverage line remains under pressure during dispense of the beverage from the faucet, and
   a nitrogen gas feed supply line from the controlled pressurized supply of gas to the liquid/gas contactor membrane unit comprises a check valve preventing liquid flow from the liquid/gas contactor membrane unit into the pressurized gas supply line.

2. The system of claim 1, wherein the water supply comprises a pressurizable container to supply the water.

3. The system of claim 2, having a nitrogen gas supply manifold comprising at least three nitrogen regulators, one regulator controlling nitrogen supply and pressure to the first and second diaphragm pumps, one regulator controlling nitrogen supply and pressure to the liquid/gas contactor membrane unit, and one regulator controlling nitrogen supply and pressure to the pressurizable water supply container.

4. The system of claim 1, further comprising a chiller system or a refrigeration system that contains at least the bag-in-box beverage concentrate container.

5. The system of claim 4, wherein at least the bag-in-box container is cooled by the chiller system or the refrigeration system.

6. The system of claim 2, further comprising a chiller system or a refrigeration system that contains at least the bag-in-box beverage concentrate container.

7. The system of claim 6, wherein at least one of the faucet tower, water supply container and liquid/gas contactor unit are cooled by the chiller system or the refrigeration system.

8. The system of claim 1, wherein the beverage faucet is a slow pour faucet optionally fitted with a restrictor nozzle or restrictor plate that allows for release of $N_2$ or $N_2/CO_2$ gas from the beverage when dispensed to a receiver.

9. The system of claim 1, wherein the gas comprising nitrogen is a pure nitrogen gas having at least 99.5% $N_2$.

10. The system of claim 6, wherein the chiller or refrigeration system is capable of cooling at least the bag-in-box container to a temperature from ambient temperature to 34° F.

11. The system of claim 1, further comprising an inline strainer and/or filtration unit in the water supply line prior to the liquid/gas contactor membrane unit.

12. A beverage dispensing unit comprising in one contained unit the system of claim 1 and a chiller or refrigeration system.

13. A beverage dispense kit, comprising at least the system of claim 1 in a self-contained unit.

14. The dispense kit of claim 13, wherein the self-contained unit is capable of being affixed to a wall or a panel.

15. The beverage dispense kit of claim 13, further comprising a system for dispense of a non-nitrogen infused beverage; the non-nitrogen infused beverage system comprising:
- a water line directly from the second diaphragm pump to a third flow controlling needle valve, to a third back check valve and to a non-nitrogenated beverage mixing point;
- a second beverage concentrate line from the first diaphragm pump to a fourth flow controlling needle valve, to a fourth back-check valve and to the non-nitrogenated beverage mixing point;
- a beverage line from the non-nitrogenated beverage mixing point to a non-nitrogenated beverage faucet; and
- a non-nitrogenated beverage dispense tower comprising the non-nitrogenated beverage faucet.

\* \* \* \* \*